United States Patent
Kubo et al.

(10) Patent No.: US 7,850,201 B2
(45) Date of Patent: Dec. 14, 2010

(54) GAS GENERATOR AND METHOD OF MANUFACTURING THE SAME

(75) Inventors: Dairi Kubo, Himeji (JP); Kazuhisa Tamura, Himeji (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 290 days.

(21) Appl. No.: 11/814,438

(22) PCT Filed: Jan. 20, 2006

(86) PCT No.: PCT/JP2006/300808
§ 371 (c)(1),
(2), (4) Date: Jul. 20, 2007

(87) PCT Pub. No.: WO2006/077952
PCT Pub. Date: Jul. 27, 2006

(65) Prior Publication Data
US 2008/0143089 A1    Jun. 19, 2008

(30) Foreign Application Priority Data
Jan. 21, 2005    (JP)    ............................. 2005-014433

(51) Int. Cl.
*B60R 21/26* (2006.01)
(52) U.S. Cl. ...................... 280/741; 280/742
(58) Field of Classification Search ................. 280/741, 280/742
See application file for complete search history.

(56) References Cited

U.S. PATENT DOCUMENTS

| | | | | |
|---|---|---|---|---|
| 6,290,256 B1 * | 9/2001 | McFarland et al. | ........... | 280/736 |
| 6,315,322 B1 * | 11/2001 | Mika | ........................ | 280/736 |
| 6,474,684 B1 * | 11/2002 | Ludwig et al. | .............. | 280/741 |
| 6,527,297 B1 * | 3/2003 | Parkinson et al. | ........... | 280/741 |
| 6,666,476 B2 * | 12/2003 | Rink et al. | ................... | 280/741 |
| 6,718,884 B1 * | 4/2004 | Yabuta et al. | ............... | 102/530 |
| 6,722,694 B1 * | 4/2004 | Nakashima et al. | ......... | 280/736 |
| 6,739,621 B2 * | 5/2004 | Parkinson et al. | ........... | 280/741 |
| 6,808,204 B1 * | 10/2004 | Katsuda et al. | ............. | 280/741 |

(Continued)

FOREIGN PATENT DOCUMENTS

JP    10 95303    4/1998

(Continued)

*Primary Examiner*—Toan C To
(74) *Attorney, Agent, or Firm*—Oblon, Spivak, McClelland, Maier & Neustadt, L.L.P.

(57) ABSTRACT

A gas generator that eliminates work for welding-fixing a holder to a housing and subjecting the holder to an excess processing, which can be easily manufactured at low cost, and a method for manufacturing the gas generator. The gas generator includes an approximately short cylindrical housing including a bottomed member and a lid member, gas generants arranged in the housing to generate a high-temperature gas by combustion, a filter arranged in an inner circumference part of the housing so as to surround the gas generants in a diameter direction of the housing, an igniter energized from the outside to ignite, and a holder to which the igniter is fixed and that is fixed to the bottomed member so that the igniter is arranged coaxially with the housing. At least one of the holder and the bottomed member is clamped, and pressed and deformed in an axial direction of a hole so that the holder is fixed to the bottomed member.

14 Claims, 4 Drawing Sheets

U.S. PATENT DOCUMENTS

| | | | |
|---|---|---|---|
| 6,983,956 B2 * | 1/2006 | Canterberry et al. | 280/741 |
| 7,007,971 B2 * | 3/2006 | Koga | 280/736 |
| 7,125,041 B2 * | 10/2006 | Kato et al. | 280/736 |
| 7,347,448 B2 * | 3/2008 | Smith et al. | 280/736 |
| 7,350,810 B2 * | 4/2008 | Blessing et al. | 280/736 |
| 7,401,810 B2 * | 7/2008 | Brisighella et al. | 280/741 |
| 7,461,860 B2 * | 12/2008 | Ryan et al. | 280/741 |
| 7,516,983 B2 * | 4/2009 | Suehiro et al. | 280/741 |
| 2002/0189487 A1 | 12/2002 | Kubo et al. | |
| 2004/0061319 A1 * | 4/2004 | Saso et al. | 280/741 |
| 2004/0075258 A1 | 4/2004 | Kubo et al. | |
| 2004/0232679 A1 | 11/2004 | Kubo et al. | |
| 2005/0183606 A1 | 8/2005 | Kubo et al. | |
| 2006/0208474 A1 | 9/2006 | Kubo et al. | |

FOREIGN PATENT DOCUMENTS

| | | |
|---|---|---|
| JP | 2001 97177 | 4/2001 |
| JP | 2003 112597 | 4/2003 |
| JP | 3475392 | 9/2003 |
| JP | 2004 293835 | 10/2004 |
| WO | 01 74632 | 10/2001 |

* cited by examiner

GAS GENERATOR AND METHOD OF MANUFACTURING THE SAME

TECHNICAL FIELD

The present invention relates to a gas generator for inflating and deploying an airbag of an automobile, etc., more particularly, it relates to a gas generator to which an igniter can be fixed simply and at low cost.

BACKGROUND ART

A gas generator for immediately deploying an airbag has been conventionally built in various airbag modules in order to protect an occupant from an impact caused by an automobile crash. The gas generator immediately generates a large amount of high-temperature gas based on a crash detection signal transmitted from a crash sensor at the time of an automobile crash.

For the gas generator, an igniter which has a system for igniting an inner ignition material when receiving the crash detection signal from the crash sensor and converts an electric signal to ignition energy, gas generants for receiving the ignition energy from the igniter to generate a large amount of gas, a metallic cylindrical housing for housing the igniter and the gas generants therein, and a holder for fixing the igniter to the housing are typically cited as minimum components required. Additionally, a filter may be employed which absorbs a large amount of heat and combustion particles generated by combust ion of the gas generants as the need arises.

Moreover, a main part of the igniter generally includes a plastic material composed of a thermoplastic resin and the like, and is fixed to the metallic holder by a caulking method.

As a method for fixing the holder to the metallic housing, welding and the like are known (see the Patent Document 1).

Additionally, as a method for fixing a sealing plate of the gas generator to the housing, caulking is known (see the Patent Document 2). Particularly, in this method, the sealing plate and the housing composed of the same kind of steel materials such as a high-tension plate are subjected to caulking and striking to be fixed to each other.

Additionally, a gas generator is known in which a part of an inner cylindrical member provided in the housing is caulked so that an igniter assembly (igniter and collar) is fixed to the inner cylindrical member (see the Patent Document 3).

Additionally, a gas generator is known in which a part of an elongated cylindrical housing is diameter-reduction processed in relation to a lid member with a stage so that the lid member is fixed to the housing (see the Patent Document 4).
Patent Document 1: Japanese Unexamined Patent Publication No. 2003-112597
Patent Document 2: U.S. Pat. No. 3,475,392
Patent Document 3: Japanese Unexamined Patent Publication No. 2004-293835
Patent Document 4: International Publication No. WO01/074632

DISCLOSURE OF THE INVENTION

Problem(s) to be Solved by the Invention

In the Patent Document 1, for example, when an iron-based material widely used at present is used for a housing, it is preferable that the same Kind of iron-based material is necessarily used for a holder in terms of welding. However, the holder is required to be cut into a shape suitable for fixing an igniter in a process such as caulking, and the iron-based material is relatively expensive to cut.

In the Patent Document 2, a relatively complicated work is required that a sealing plate composed of a steel material is fixed in a pipe body composed of a steal material by caulking, and that a surface of the sealing plate is subjected to striking so that struck indentations are left along a circumferential edge of the sealing plate.

In the Patent Document 3, a work is required that an igniter assembly is fixed to the inside of an inner cylindrical member and the inner cylindrical member is welding-fixed to a closure shell (housing).

In the Patent Document 4, a lid member with a stage is required to be formed thereby increasing cost.

Thereupon, the present invention aims at providing a gas generator that eliminates works for welding-fixing a holder to a housing and subjecting the holder to an excess processing, and can be easily manufactured at low cost and a method for manufacturing.

Means for Solving the Problem and Effect

A gas generator of the present invention includes a holder which has a short cylindrical external shape for fixing an igniter, and a housing which has a bottomed member having a hole, into which the holder is fitted, on the bottom and can contain gas generants therein. In the gas generator, the holder is fitted in the hole, at least one of the holder and the bottomed member is deformed in a diameter direction of the hole, and thus the holder is fixed to the housing.

According to the above configuration, a gas generator which is manufactured without work for welding-fixing the holder to the bottomed member and subjecting the holder to an excess processing, and which has a high airtightness in a contact part between the holder and the bottomed member can be provided.

In the gas generator of the present invention, the holder has an approximately columnar external shape, and it is preferable that the holder is deformed in a diameter expansion direction, or the bottomed member is deformed in a diameter reduction direction of the hole.

According to the above configuration, it is much less necessary that a projection part, a groove part, or the like is formed on the bottomed member or the holder of the housing in order to fix them by caulking or the like. Therefore, the gas generator can be provided at low cost.

In the gas generator of the present invention, it is preferable that at least one of the holder and the bottomed member is clamped and pressurized in the direction of a center axis of the hole to be deformed.

According to the above configuration, a gas generator which is manufactured by a process easier than the process for directly deforming the bottomed member or the holder in the diameter direction, and which has high fixing strength between the holder and the bottomed member, and has high airtightness in the contact part between the holder and the bottomed member can be reliably provided.

In the gas generator of the present invention, it is preferable that the holder and the bottomed member are respectively composed of materials having strengths different from each other, and that one composed of the material having a lower strength is deformed.

According to the above configuration, the material having the lower strength is easily closely adhered to an interface of the material having a higher strength with no space therebetween. Accordingly, a gas generator excellent in strength and airtightness in a fixed contact part between the holder and the bottomed member can be provided.

In the gas generator of the present invention, it is preferable that the holder has at least two outer diameters different from each other, and that an inequality, A≦an inner diameter C of the hole provided in the bottomed member≦B, is established wherein A represents a smaller outer diameter and B represents a larger outer diameter.

According to the above configuration the holder can be constructed so that it hardly comes off the bottomed member, and the possibility can be lowered that the holder comes off, for example, in the case where the gas generator operates and an inner pressure becomes high.

In the gas generator of the present invention, it is preferable that the bottomed member is composed of an iron-based metallic material and the holder is composed of an aluminum-based material.

A groove or the like has been conventionally required to be provided in the holder so that the igniter is fixed to the holder. However, the cost required in a cutting process in the case where the holder is composed of the aluminum-based material is lower than that in the case of being composed of the iron-based material, and therefore the aluminum-based material is more preferable.

A method for manufacturing the gas generator of the present invention includes the step of fitting and fixing the holder for fixing the igniter into the housing which has the bottomed member having the hole in the bottom and can contain gas generants therein, wherein the step of fitting and fixing includes the step of clamping and pressurization-deforming in the direction of the center axis of the hole at least one of the holder and the bottomed member.

According to the above configuration, the gas generator which has high air tightness in the contact cart between the holder and the bottomed member can be manufactured, without the work for welding-fixing the holder to the bottomed member and subjecting the holder to an excess processing.

In the method for manufacturing the gas generator of the present invention, it is preferable that the holder and the bottomed member are respectively composed of materials having strengths different from each other, and that one composed of the material having the lower strength is deformed.

According to the above configuration, the material having the lower strength is easily closely adhered to an interface of the material having the higher strength with no space therebetween. Accordingly, the gas generator excellent in strength and airtightness in the fixed contact part between the holder and the bottomed member can be provided.

BEST MODE FOR CARRYING OUT THE INVENTION

A gas generator according to a first embodiment of the present invention will be described below with reference to the accompanying drawings.

FIG. 1 is a cross sectional view of a gas generator 101 which is an example of the gas generator of the present invention. In FIG. 1, the gas generator 101, which inflates and deploys, for example, a driver seat airbag, includes an approximately short cylindrical housing 3 including a bottomed member 3a and a lid member 3b, gas generants 4 which are arranged in the housing 3 to generate a high-temperature gas by combustion, a filter 5 which is arranged in an inner circumference part of the housing 3 so as to surround the gas generants 4 in a diameter direction of the housing 3, an igniter 1 which is energized from the outside to ignite, and a holder 2 to which the igniter 1 is fixed and which is fixed to the bottomed member 3a so that the igniter 1 is arranged coaxially with the housing 3.

The lid member 3b has a cylindrical part having a plurality of gas discharging holes 7, and a bottom part provided at one end of the cylindrical part. A diameter of an opening side of the lid member 3b is expanded so that the opening has a flange shape. Additionally, the bottomed member 3a similarly has a cylindrical part and a bottom part, and a hole 3c, into which the holder 2 is to be fitted and arranged, is provided in the bottom part. An opening of the bottomed member 3a engages with the vicinity of the opening of the lid member 3b, and the bottomed member 3a and the lid member 3b are fixed to each other in a welding part 8 by welding, etc. Here as materials of the bottomed member 3a and the lid member 3b, metallic materials such as iron, stainless-steel, aluminum and steel are applicable. Additionally, it is preferable that thicknesses of the bottomed member 3a and the lid member 3b are in a range of 1.0 to 3.0 mm.

As described above, the plurality of gas discharging holes 7 for discharging gas generated by combustion of the gas generants 4 are provided in the cylindrical part of the lid member 3b. The plurality of gas discharging holes 7 enable the high-temperature gas discharged from the inside of the gas generator 101 to be stably supplied to a target place such as an inside of the airbag. The gas discharging holes 7 are manufactured in a cutting process, a press-molding process, or the like. It is preferable that a shape of the gas discharging hole 7 is circular having a diameter in a range of 1.0 to 5.0 mm, in terms of ease in manufacturing.

Additionally, a band-shaped rupture member 9 is arranged along the inside of the cylindrical part, in which the gas discharging holes 7 are positioned, of the lid member 3b, and the rupture member 9 seals the gas discharging holes 7 so that the inside of the gas generator 101 is formed into a sealed space. When the gas generator 101 operates, an inner pressure of the gas generator 101 is raised by the combustion of the gas generants 4, the rupture member 9 is ruptured, and the gas is discharged from the gas discharging holes 7. Here, as a material of the rupture member 9, steel materials such as iron, stainless-steel and aluminum and a film made of plastic, etc., are applicable. Additionally, although the thickness of the rupture member varies in accordance with the strength of the materials to be used, it is preferable that it is in a range of 0.01 to 0.5 mm. Additionally the strength of the rupture member 9 is set so as to vary in accordance with the hole diameter of the gas discharging hole 7. Particularly, it is preferable that the strength of the rupture member 9 is set so as to be raised as the hole diameter of the gas discharging hole 7 becomes small. Thus, when the gas generator 101 operates, an initial inner pressure is controlled and a suitable combustion property of the gas generants 4 can be obtained.

The filter 5 is arranged outside a columnar space formed in the housing 3 and along an inner wall of the housing 3. The filter 5 is fixed so as to be clamped between the bottomed member 3a and the lid member 3b in an axial direction, and fixed in a manner that is fitted in an inner circumference part of the bottomed member 3a in a circumferential direction. Additionally, the filter 5 is formed by forming an aggregate of stockinet wire netting, plain-woven wire netting, crimp-woven metal wire or wound metal wire into a ring having a predetermined thickness. The filter 5 has the effects of cooling combustion gas of the gas generants 4, and of collecting metal particles generated by the combustion of the gas generants 4 to make it difficult for a solid product to come out of the gas generator 101.

The inner space surrounded by the filter 5 in the housing 3 is filled with the gas generants 4. Preferably, a non-azide-based composition for example a composition of fuel, oxidizer and additives (binder, slag forming agent, combustion adjusting agent and the like) is used as the gas generants 4.

As a fuel, a nitrogen containing compound is applicable. As a nitrogen containing compound for example, one compound or a mixture of two or more compounds is applicable which is selected from triazole derivatives, tetrazole derivatives, guanidine derivatives, azodicarbonamide derivatives, hydradine derivatives, urea derivatives and ammine complexes. Preferably, among these nitrogen containing compounds, one compound or a mixture of two or more compounds selected from the tetrazole derivatives and the guanidine derivatives is used, and more preferably, nitroguanidine, guanidine nitrate, cyanoguanidine, 5-aminotetrazole, aminoguanidine nitrate and guanidine carbonate are used.

A combination rate of the above nitrogen containing compound in the gas generants 4 varies depending on the numbers of carbon atoms, hydrogen atoms and the other atoms to be oxidized in a molecular formula, and generally, it is preferably in a range of 20 to 70 percent by weight, more preferably, is in a range of 30 to 60 percent by weight. Additionally, an absolute value of the combination rate of the nitrogen containing compound varies depending on the kind of oxidizer to be added to the gas generants 4. However, when the absolute value of the combination rate of the nitrogen containing compound is larger than a perfect oxidation theoretical amount, a concentration of trace CO in the generated gas increases. On the other hand, when the absolute value of the combination rate of the nitrogen containing compound is equal to or less than the perfect oxidization theoretical amount, a concentration of trace NOx in the generated gas increases. Accordingly, most preferably, the absolute value is in a range that a balance of both the concentrations is kept optimal.

As the oxidizer, at least one selected from nitrate, nitrite and perchlorate, which each contains cation, of alkaline metal, alkaline earth metal, transition metal or ammonium is preferably used. As the nitrates for example, sodium nitrate, potassium nitrate, magnesium nitrate, strontium nitrate, phase-stabilized ammonium nitrate, basic copper nitrate and the like are applicable, and preferably, the strontium nitrate, phase-stabilized ammonium nitrate, basic copper nitrate are used.

An absolute value of a combination rate of the oxidizer in the gas generants 4 varies depending on the kind and amount of the nitrogen containing compound to be used. Preferably, it is in a range of 30 to 80 percent by weight, and more preferably, is in a range of 45 to 75 percent by weight in terms of the concentrations of CO and NOx.

As the binder which may be contained in the gas generants 4, organic binders such as methyl cellulose, hydroxypropyl methyl cellulose, carboxymethyl cellulose, nitrocellulose, cellulose acetate, polyvinyl alcohol, polyacrylamide, and inorganic binders such as synthetic hydrotalcite, acid clay, talc, kaolin, silica, alumina are applicable.

Additionally, as a concrete example of the slag forming agent which may be contained in the gas generants 4, silicon nitride, silicon carbide, acid clay, natural clay, artificial clay, talc and the like can be cited.

The gas generants 4 composed as described above are adjusted into a desired shape by press-molding, extrusion-molding or the like. As a shape of the gas generants 4, column, cylinder, disc, or hollow in which both ends are closed can be cited.

The igniter 1 is fixed to the holder 2 by caulking or the like via an O-ring 12 composed of rubber and the like. At this time, the interface of the igniter 1 and the holder 2 has a sealing property due to the O-ring. The igniter 1 has a role of converting electric energy energized by the sensor into combustion energy of powder included therein. The majority of the exterior of the igniter 1 is covered with a thermoplastic resin and the like by molding to be electrically insulated.

The holder 2 has at least two outer diameters different from each others and it is preferable that an inequality, $A \leq$ an inner diameter C of the hole provided in the bottomed member 3a $\leq B$, is established wherein A represents the smaller outer diameter and B represents the larger router diameter (for example, see the holder 2 shown in FIG. 2 and FIG. 3). As a material of the holder 2, metals such as iron, stainless-steel, aluminum and steel are applicable. In the embodiment, it is preferable that the material of the holder 2 is selected to have a strength essentially different from that of a material used for the bottomed member 3a. For example, a combination of iron, aluminum, and the like is suitable for the above material.

According to the embodiment, the gas generator 101 which is manufactured without work for welding-fixing the holder 2 to the bottomed member 3a and subjecting the holder 2 to an excess processing, and which has high airtightness in a contact part between the holder 2 and the bottomed member 3a can be provided.

Additionally, it is much less necessary that a projection part, a groove part, or the like is formed on the holder 2 or the bottomed member 3a of the housing in order to fix them by caulking or the like. Therefore, the gas generator 101 can be provided at low cost.

Further, the gas generator 101 which is manufactured by a process easier than the process for directly deforming the holder 2 or the bottomed member 3a in the diameter direction, and which has high fixing strength between the holder 2 and the bottomed member 3a, and has high airtightness in the contact part between the bottomed member 3a and the holder 2 can be reliably provided.

Furthermore, since the holder 2 and the bottomed member 3a are respectively composed of materials having strengths different from each other, the material having the lower strength is easily closely adhered to the material having a higher strength, and thus the gas generator 101 excellent in strength and airtightness in a fixed contact part between the holder 2 and the bottomed member 3a can be provided.

Additionally since a diameter of a part of the holder 2 inside of the bottomed member 3a is made larger than that of the hole 3c, the holder 2 can be constructed so that it hardly comes off the bottomed member 3a. Accordingly, the possibility can be lowered that the holder 2 comes off, for example, in the case where the gas generator 101 operates and the inner pressure becomes high.

Additionally, a groove or the like has been conventionally required to be provided in the holder 2 so that the igniter 1 is fixed to the holder 2. However, the cost for a cutting process in the case where the holder is composed of the aluminum-based material is lower than that in the case of being composed of the iron-based material, and therefore the holder composed of the aluminum-based material is more preferable.

Next, a method for fixing the holder 2 to the bottomed member 3a in the gas generator 101 according to the present invention will be described with reference to FIG. 2. FIG. 2 shows, the bottomed member 3a, the holder 2 before the igniter 1 is fixed thereto, an approximately cylindrical bottomed member pressing down metal fitting 10a, and an approximately cylindrical bottomed member pressing up metal fitting 10b. First, the holder 2 is inserted into the hole 3c provided in the bottomed member 3a. Next, as shown in FIG. 2 the bottomed member pressing down metal fitting 10a is pressed from the downside to the upside in the axial direction of the bottomed member 3a and simultaneously the bottomed member pressing up metal fitting 10b is pressed from the upside to the downside in the axial direction of the bottomed member 3a. Thereby the metal fittings clamp therebetween an outer circumferential part of the hole 3c located outside the bottomed member 3a and an outer circumference of a projection part (whose diameter is represented as B) of the holder 2 located inside the bottomed member 3a. As a result, the bottomed member 3a is deformed in a diameter reduction direction, and consequently a diameter of the hole 3c provided in the housing 3 is deformed in a diameter reduction direction, thereby the interface of the holder 2 is adhered and fixed to the bottomed member 3a. The bottomed member 3a, the holder 2, the bottomed member pressing down metal-fitting 10a and the bottomed member pressing up metal fitting 10b are coaxially arranged by a guide not shown.

Next, a difference between the strengths of the holder 2 and the bottomed member 3a in the present invention will be described. In the present invention, it is particularly preferable that there is a difference between tensile strengths among mechanical properties of metal. The tensile strength is a value which is calculated, when a material piece endures a large load exceeding a break-down point and endurance in the tension test, by dividing the maximum load at the time by a cross sectional area of the material piece before a tension test. Additionally, the tensile strength is closely related to hardness, and an estimation value of the hardness can be calculated based on the tensile strength with use of the following expression:

Tensile Strength 1(N/mm$^2$)
=3.268871$HV$≈20.593889$HS$≈31.381116$HRC$

Here, HV represents Vickers hardness HS represents Shore hardness, and HRC represents Rockwell hardness. Additionally, the relationship between the hardnesses including Brinell hardness (HB) can be checked with use of a hardness conversion chart.

In an adhering part between the holder 2 and the housing 3, a material having a low tensile strength adheres to gaps in a surface of a material having a high tensile strength so that a high sealing property is kept.

Generally, in terms of materials, a combination of the aluminum-based material and the iron-based material is particularly effective. Here, the aluminum-based material includes an aluminum alloy containing iron, manganese or the like, in addition to pure aluminum. Additionally, the iron-based material includes steel containing carbon, and cast iron, in addition to pure iron containing no carbon, and further includes a special steel containing nickel, chrome, molybdenum or the like, and may be subjected to thermal treatment.

According to the above method, the gas generator 101 can be manufactured without work for welding-fixing the holder 2 to the bottomed member 3a and subjecting the holder 2 to an excess processing, and which has the high airtightness in the contact part between the holder 2 and the bottomed member 3a.

Additionally, in the case where the holder 2 and the bottomed member 3a are respectively composed of the materials having the strengths different from each other, and where one composed of the material having the lower strength is deformed, the material having the lower strength is easily adhered to the material having the higher strength with no space therebetween, and thus a gas generator which is excellent in strength and airtightness in the fixed contact part between the holder 2 and the bottomed member 3a can be manufactured.

Additionally, in the above-described tensile strength, preferably, a strength difference at a normal temperature (5 to 35° C.) in the present invention, a value of "the tensile strength of the material having the large strength—the tensile strength of the material having the small strength" is in a range of 10 to 800 N/mm$^2$, more preferably, is in a range of 50 to 400 N/mm$^2$. When the strength difference is set in such a range, a gas generator which is excellent in strength and airtightness can be manufactured.

Next, a method for fixing the holder 2 to the bottomed member 3a in the gas generator 101 according to another embodiment of the present invention will be described with reference to FIG. 3. FIG. 3 shows the bottomed member 3a, the holder 2 before the igniter 1 is fixed thereto, an approximately cylindrical holder pressing down metal fitting 11a, and an approximately cylindrical holder pressing up metal fitting 11b. First, the holder 2 is inserted into the hole 3c provided in the bottomed member 3a. Next, as shown in FIG. 3, the holder pressing down metal fitting 11a is pressed against the holder 2 from the downside to the upside in the axial direction, the holder pressing up metal fitting 11b is simultaneously pressed against the holder 2 from the upside to the downside in the axial direction, and an upper surface of an upper part of the projection part (the diameter is represented as B) of the holder 2 and a lower surface of a lower part (the diameter is represented as A) of the holder 2 are faced and clamped by the metal fittings. Thus, the holder 2 is deformed in a diameter expansion direction, and consequently is deformed in the diameter expansion direction relative to the diameter of the hole 3c provided in the bottomed member 3a. Thereby, the holder 2 is adhered and fixed to the bottomed member 3a. The bottomed member 3a, the holder pressing down metal fitting 11a and the holder pressing up metal fitting 11b are coaxially arranged by a guide not shown.

According to the above-described method, an effect can be obtained that is similar to the effect obtained by the method described above with reference to FIG. 2.

Moreover, although not shown, holder pressing metal fittings, which are combinations of the holder pressing down metal fitting and the holder pressing up metal fitting shown in FIG. 2 and FIG. 3, may be used so that the holder 2 and the bottomed member 3a are simultaneously clamped and fixed. Thus, a gas generator which has higher strength and airtightness can be manufactured.

The present invention is not limited to the above embodiments, and various modifications can be performed without departing from the scope of the appended claims. For example, like a gas generator 102 shown in FIG. 4, into which the gas generator 101 according to the first embodiment is modified, the holder 2 of the first embodiment may be replaced by a holder 14 to which the igniter 1 and an enhancer holder 13 are caulking-fixed. Moreover the enhancer holder 13 is caulking-fixed to the holder 14 in states where an upper part of the igniter 1 is covered by the enhancer holder 13 and a space between the igniter 1 and the enhancer holder 13 is filled with powder 15.

Figure 1:
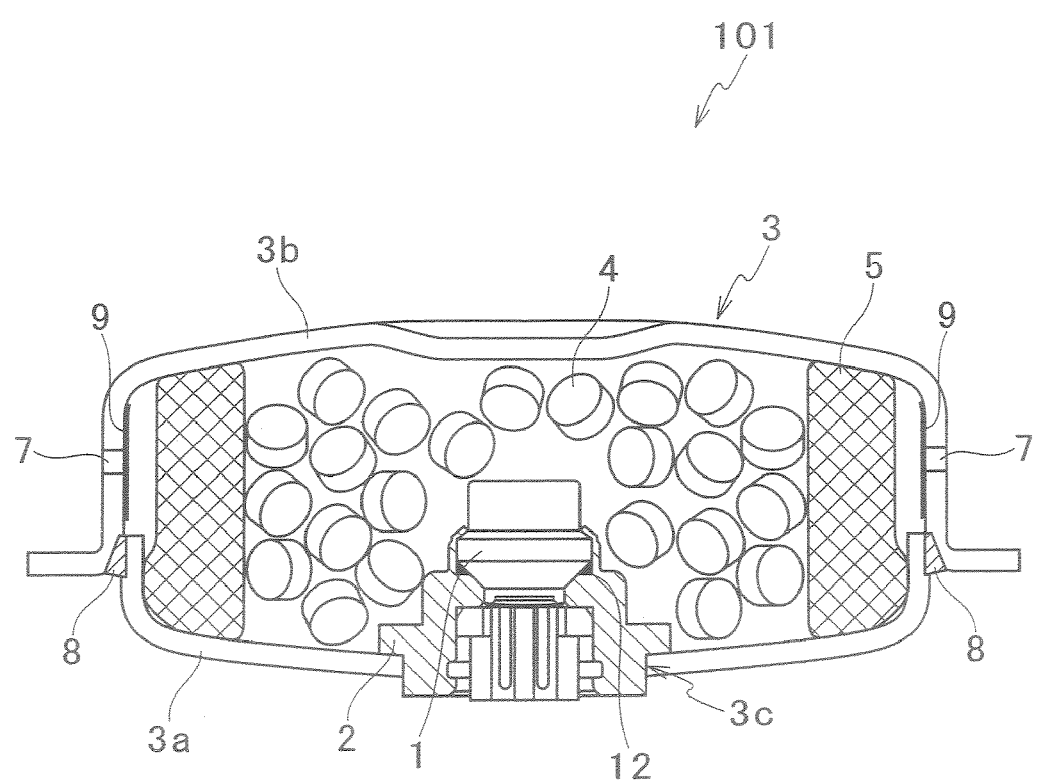
FIG. 1 is a cross sectional view in an axial direction of a gas generator according to a first embodiment of the present invention.
Figure 2:
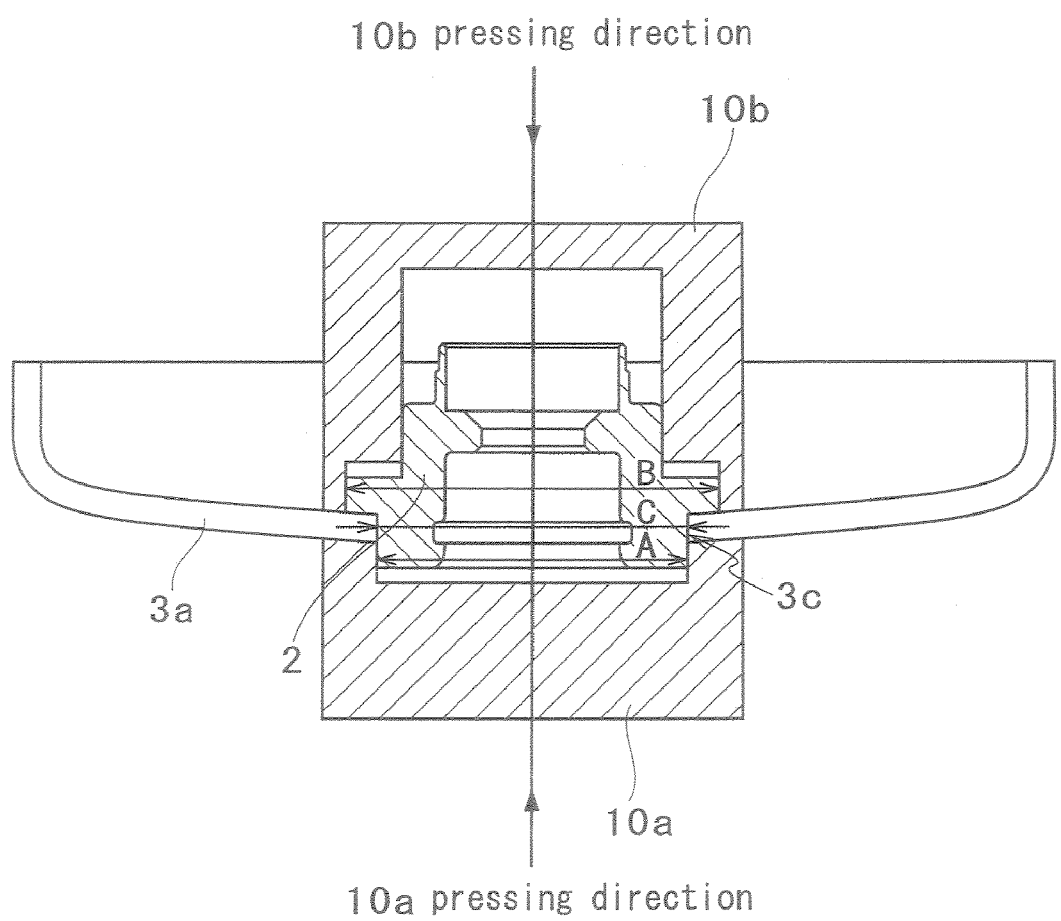
FIG. 2 is a view showing a case where the bottomed member is deformed when a holder is fixed to the bottomed member in the gas generator according to the first embodiment of the present invention.
Figure 3:
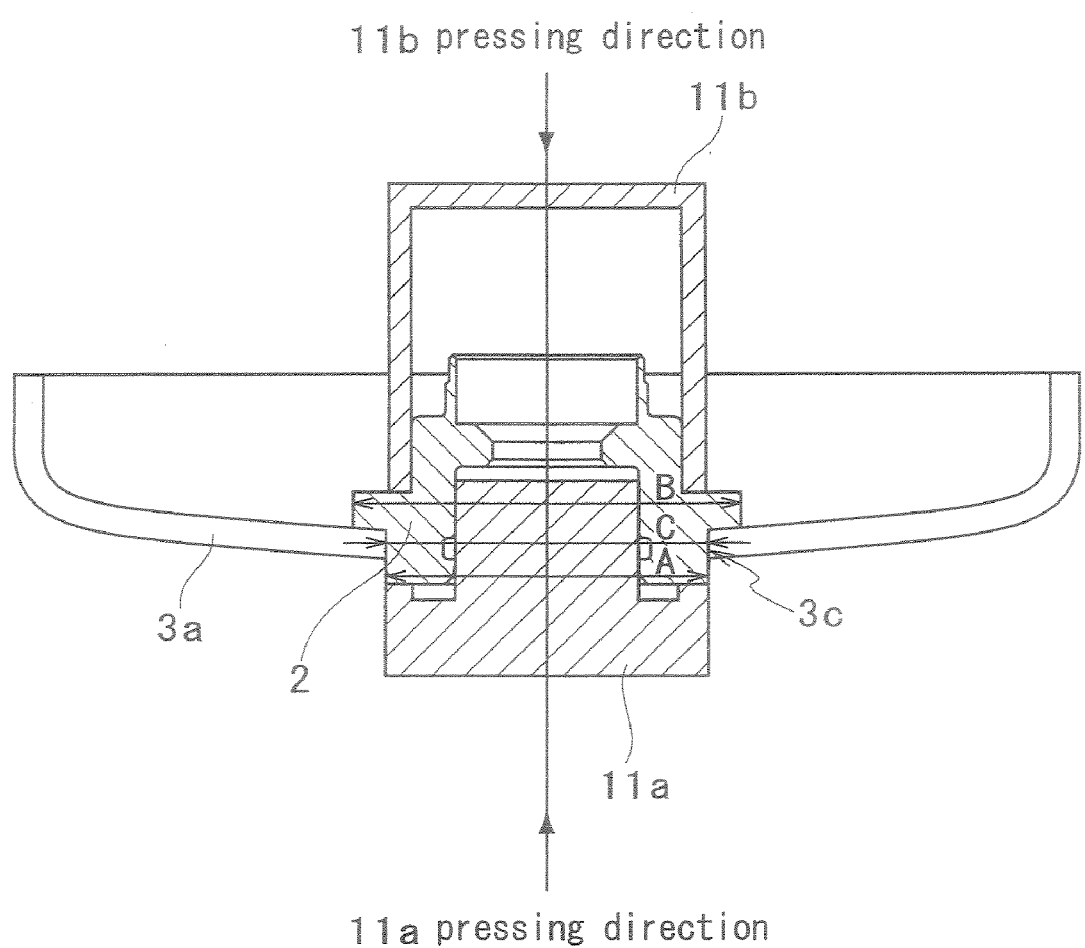
FIG. 3 is a view showing a case where the holder is deformed when the holder is fixed to the bottomed member in the gas generator according to the first embodiment of the present invention.
Figure 4:
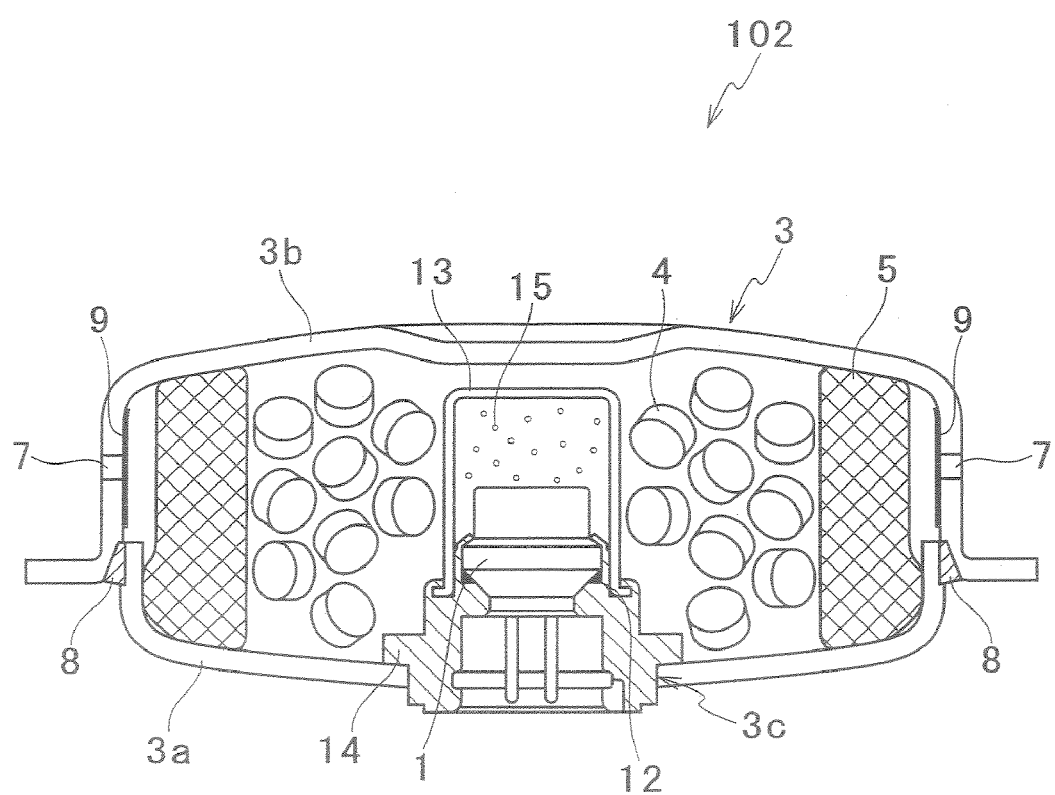
FIG. 4 is a cross sectional view in an axial direction of a gas generator according to a modification of the first embodiment of the present invention.

DESCRIPTION OF SYMBOLS 1 igniter
2, 14 holder
3 housing
3a bottomed member
3b lid member
3c hole
4 gas generants
5 filter
7 gas discharging hole
8 welding part
9 rupture member
10a bottomed member pressing down metal fitting
10b bottomed member pressing up metal fitting
11a holder pressing down metal fitting
11b holder pressing up metal fitting
12 O-ring
13 enhancer holder
15 powder
101, 102 gas generator

What is claimed is:

1. A gas generator which has a short cylindrical external shape, comprising:
   a holder which fixes an igniter; and
   a housing which contains gas generants therein, the housing including a bottomed member provided with a hole on the bottom, into which hole the holder is fitted,
   wherein the holder is fitted in the hole, the holder and the bottomed member are pressed against each other in a diameter direction of the hole, and thus the holder is fixed to the housing, thus providing airtightness in a fixed contact part between the holder and the bottomed member, and
   wherein the holder includes a first material and the bottomed member includes a second material, a tensile strength of the first material is different from a tensile strength of the second material, and one that includes the material with a lower tensile strength is deformed.

2. The gas generator as set forth in claim 1, wherein
   the holder includes an approximately columnar external shape, and
   the holder is deformed in a diameter expansion direction, or the bottomed member is deformed in a diameter reduction direction of the hole.

3. The gas generator as set forth in claim 1, wherein at least one of the holder and the bottomed member is clamped and pressurized in an axial direction of the hole to be deformed.

4. The gas generator as set forth in claim 1, wherein the holder includes a first outer diameter and a second outer diameter, the first and second outer diameters are different from each other, and an inequality,
   $A \leq$ an inner diameter C of the hole provided in the bottomed member $\leq B$
   is established where A represents the first smaller outer diameter and B represents the second larger outer diameter.

5. The gas generator as set forth in claim 4, wherein the first outer diameter of the holder is constant in the fixed contact part between the holder and the bottomed member.

6. The gas generator as set forth in claim 1, wherein the igniter and an enhancer holder are fixed to the holder, and an upper part of the igniter is covered by the enhancer holder.

7. The gas generator as set forth in claim 6, wherein a space between the igniter and the enhancer holder is filled with powder.

8. A gas generator which has a short cylindrical external shape, comprising:
   a holder which fixes an igniter; and
   a housing which contains gas generants therein, the housing including a bottomed member provided with a hole on the bottom, into which hole the holder is fitted,
   wherein the holder is fitted in the hole, the holder and the bottomed member are pressed against each other in a diameter direction of the hole, and thus the holder is fixed to the housing, thus providing airtightness in a fixed contact part between the holder and the bottomed member, and
   wherein the bottomed member includes an iron-based material, and the holder includes an aluminum-based material.

9. The gas generator as set forth in claim 8, wherein
   the holder includes an approximately columnar external shape, and
   the holder is deformed in a diameter expansion direction, or the bottomed member is deformed in a diameter reduction direction of the hole.

10. The gas generator as set forth in claim 8, wherein at least one of the holder and the bottomed member is clamped and pressurized in an axial direction of the hole to be deformed.

11. The gas generator as set forth in claim 8, wherein the holder includes a first outer diameter and a second outer diameter, the first and second outer diameters are different from each other, and an inequality,
    $A \leq$ an inner diameter C of the hole provided in the bottomed member $\leq B$
    is established where A represents the first smaller outer diameter and B represents the second larger outer diameter.

12. The gas generator as set forth in claim 11, wherein the first outer diameter of the holder is constant in the fixed contact part between the holder and the bottomed member.

13. The gas generator as set forth in claim 8, wherein the igniter and an enhancer holder are fixed to the holder, and an upper part of the igniter is covered by the enhancer holder.

14. The gas generator as set forth in claim 13, wherein a space between the igniter and the enhancer holder is filled with powder.

* * * * *